Aug. 5, 1941.  L. N. SCHWIEN  2,251,498

AIR SPEED INDICATOR

Filed Jan. 26, 1938  4 Sheets-Sheet 1

Inventor
Leo Nevin Schwien.

Attorney.

Aug. 5, 1941.  L. N. SCHWIEN  2,251,498
AIR SPEED INDICATOR
Filed Jan. 26, 1938  4 Sheets-Sheet 2

Fig. 2.

Inventor
Leo Nevin Schwien.

Attorney.

Aug. 5, 1941. L. N. SCHWIEN 2,251,498
AIR SPEED INDICATOR
Filed Jan. 26, 1938 4 Sheets-Sheet 3

Inventor
Leo Nevin Schwien.
Attorney.

Aug. 5, 1941.  L. N. SCHWIEN  2,251,498
AIR SPEED INDICATOR
Filed Jan. 26, 1938  4 Sheets-Sheet 4

*Inventor*
*Leo Nevin Schwien.*

*Attorney.*

Patented Aug. 5, 1941

2,251,498

UNITED STATES PATENT OFFICE 2,251,498

AIR SPEED INDICATOR

Leo Nevin Schwien, Los Angeles, Calif.

Application January 26, 1938, Serial No. 187,024

31 Claims. (Cl. 73—182)

This invention relates generally to air speed indicators for aircraft, and more particularly to air speed indicators of the differential pressure type.

Air speed indicators of the differential pressure type as heretofore commonly known operate in accordance with the differential of velocity and static pressures of the air through which the aircraft is travelling. These pressures are obtained by use of two tubes placed in the air stream ahead of the aircraft, one of which, the "Pitot tube," has an open end directed forwardly, while the other, the "static tube," is closed at the end but is provided with a number of small holes open to the atmosphere. These two tubes, the pressures within which are equal respectively to the velocity air pressure and to the static air pressure, are connected to the instrument, which is designed to give an indication of air speed proportional to the differential of the two pressures. Such an instrument, however, is not compensated for several factors which are variable with different conditions of pressure, temperature and air speed, and in practice it has become conventional to use either a special computer, or tables, for correcting the air speed as so indicated for changes of pressure and temperature.

It is therefore one primary object of the present invention to provide a differential pressure air-speed indicator so compensated for pressure, temperature and air speed conditions as to read directly in true air speed.

The relation between the velocity and static pressures (as measured by the Pitot tube type of instrument) and true air speed, as given in the 1932 Reports of the National Advisory Committee for Aeronautics, page 384, is as follows:

$$P - P_o = \tfrac{1}{2}\rho V^2 \left[ 1 + \frac{\rho V^2}{4\gamma P_o} \right] \quad (1)$$

where $P$ is velocity air pressure, $P_o$ is static air pressure, $V$ is true air speed, $\rho$ is air density, and $\gamma$ is the ratio of specific heat of air at constant pressure to the specific heat of air at constant volume.

Now the factor $\rho$, or air density, is a variable depending both upon temperature and pressure, as follows:

$$\rho = \rho_s \left(\frac{P_o}{P_s}\right)\left(\frac{T_s}{T}\right)$$

where $\rho_s$ is air density at standard temperature and pressure; $P_s$ and $T_s$ are standard pressure and temperature, respectively; and $T$ is absolute temperature of the air.

Substituting this value for $\rho$ in Equation 1 and simplifying, there results:

$$P - P_o = \tfrac{1}{2}\left[\left(\frac{P_o K_1}{T}\right)V^2\right]\left[1 + \frac{K_2 V^2}{T}\right], \quad (2)$$

where $K_1$ is equal to $$\frac{\rho_s T_s}{P_s}, \text{ and } K_2 = \frac{\rho_s T_s}{4\gamma P_s}$$

The indicating instrument of the present invention is designed to take into account the variable factors $P_o$ and $T$ and the compressibility factor $$\left[1 + \frac{K_2 V^2}{T}\right]$$

as they appear in Equation 2, and therefore reads directly in true air speed.

In taking the effects of variable temperature into account, a temperature measurement means is provided embodying typically, a coil located in the external air stream and a communication line leading from said coil to a chamber in the instrument, located in the cockpit, said coil, line and chamber containing a thermal-expansive fluid such as alcohol. However, there is an ambient temperature condition at the location of the instrument, which, unless compensated, introduces an error in the external temperature measurement. It is accordingly a further object of the invention to provide means for automatically compensating the ambient temperature effect, so that the instrument operates in accordance with changes of external temperature without introduction of error by reason of a difference between external and instrument location temperatures.

Various additional objects of the invention will appear in the course of the following detailed description of a present preferred embodiment thereof, reference for this purpose now being directed to the accompanying drawings, in which:

The external casing of the instrument is designated generally at 10, and this casing is provided with a cylindrical interior opening 11, the lower end of the casing wall being flanged inwardly as at 12. The upper end of the casing has a shoulder at 13, on which rests a rubber washer 14 supporting a glass cover plate 15, the latter being retained in position by means of a split expansive ring 16 engaging in a groove at 17. A casting 18, of cylindrical external shape, fits within casing opening 11, and is secured in position by means of screws 19 passing through casing flange 12. A cylindrical cover plate 20 is secured to the upper end of casting 18 by means of screws 21, and mounted on its upper surface, which is disposed a short distance below glass plate 15, is a suitable dial 22 for the true air speed and temperature indicator hands 23 and 24, respectively.

Figure 1:
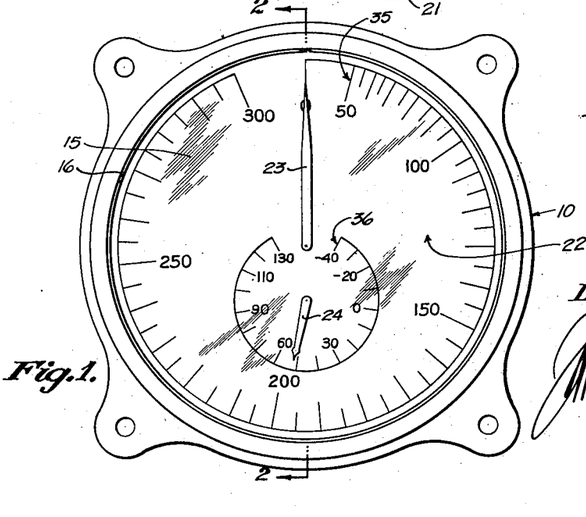
Fig. 1 is an elevation or face view of the instrument, looking toward the indicating dial.

Air speed indicator hand 23 is mounted on the reduced upper end 25a of a vertical spindle 25, preferably concentric with reference to dial 22, said shaft having bearing at 26 and 27 in cover plate 20 and a horizontal plate 28 spaced below and supported on plate 20 by means of posts 29. Temperature indicator hand 24 is similarly mounted on the reduced upper end 31a of a spindle 31 having bearing at 32 and 33 in plates 20 and 28, respectively. Suitable true air speed and temperature scales 35 and 36, respectively, are inscribed on dial 22 around the paths traversed by indicator hands 23 and 24 as indicated in Fig. 1.

The aforementioned casting 18 is closed at the bottom of the instrument, except for certain temperature and pressure line connections to be described, and is formed with an interior hollow or cavity 40 for certain mechanism to be described. The lower wall 41 of casting 18 has an integrally formed tubular portion 42, within which is press fitted a tubular adapter 43. Coupled to the lower end of this adapter is a line 44 which will be understood to communicate with the dynamic or open ended Pitot tube. The bore 45 of adapter 43 communicates with a resilient chamber having a linear law of expansion, preferably in the form of a bellows or Sylphon 46. The lower open end 47 of bellows 46 fits over, in air tight relation, an internally screwthreaded sleeve 48 which is screwed on the reduced upper end of adapter 45. To assure an air tight seal, a suitable composition is placed around the lower end portion 47 of bellows 46 and sleeve member 48, as indicated at 49 in Fig. 2. Bellows 46 is provided with a closed, flat upper end 50. The interior of bellows 46 is thus subject to air stream velocity pressure, while the pressure of chamber 40, acting on the exterior of bellows 46, is connected to the static tube, as later to be described, and is therefore at static air pressure. Bellows 46 is illustrated in the drawings at its normal extension, which position it assumes for equal internal and external pressures. That is, the bellows takes the position of Figs. 2 and 5 when air speed is zero, so that static pressure exists both within and without the bellows. As the pressure within bellows 46 increases, due to velocity pressure in the Pitot line communicating with the interior of the bellows, the bellows expands or becomes extended, the increased pressure within the bellows being resisted by the inherent resiliency or spring action of the bellows, so that the bellows extends to such a length that the differential of pressure internally and externally of the bellows is just balanced by the resistance to extension offered by the bellows itself.

The flat, horizontal upper end 50 of the bellows engages the lower end of motion transmitting means, here shown to embody a vertical post 60, the upper end of which engages the underside of a flat plate or arm 61 of a bell crank B, the latter embodying a long hub or sleeve 62 arranged for rotation on a horizontal axis. Bell crank arm 61 is horizontal, or parallel with bellows end 50, when bellows 46 is in its contracted or zero air speed position (Fig. 5).

Bell crank hub 62 has an upwardly extending pin-like arm 65, which engages the straight edge 66a of a horizontally extending pivoted arm 66, the pivot mounting of the latter being somewhat offset from the straight edge 66a of said arm engaged by pin 65. Arm 66 is thus mounted for rotation on an offset axis on a pin 67, the latter being journalled in bearings 68 and 69 provided in plates 20 and 28, respectively.

Figure 2:
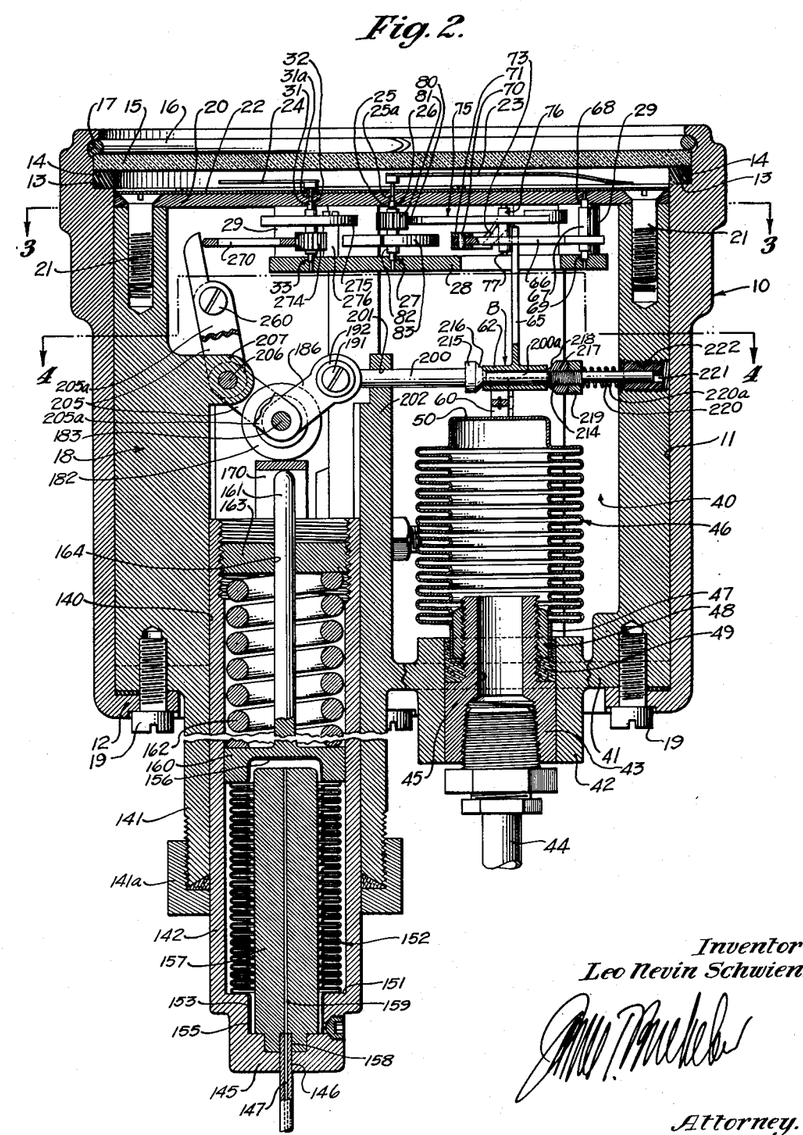
Fig. 2 is a transverse section on line 2—2 of Fig. 1.
Figure 3:
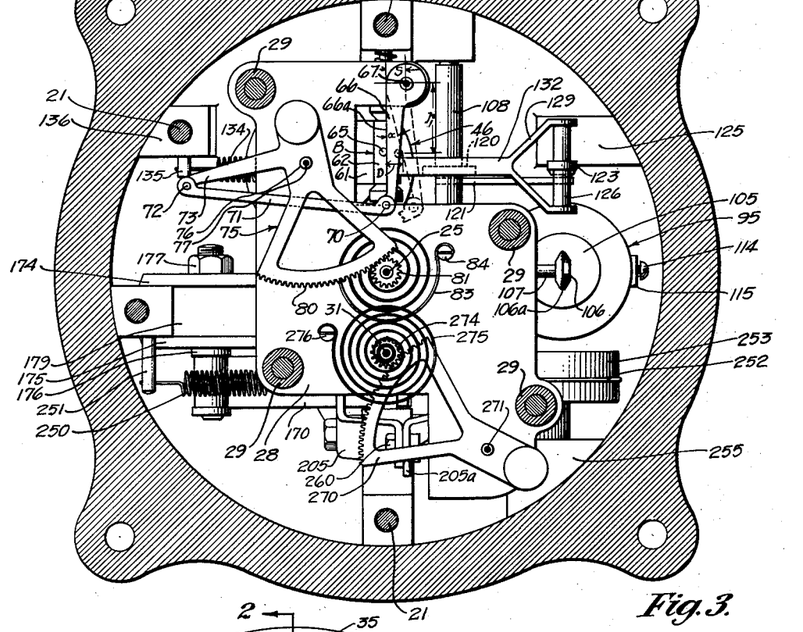
Fig. 3 is a cross section taken as indicated by line 3—3 of Fig. 2.

Pivotally connected to the swinging end of arm 66, as at 70, is one end of a link 71, the other end of which is pivotally connected at 72 to an arm 73, the latter being formed integrally with and projecting outwardly from a pivoted sector member 75. This sector member 75 has an integrally formed hub 76 tightly mounted on a vertical spindle 77 having bearing at its upper and lower ends in plates 20 and 28, respectively. Sector member 75 comprises a horizontally disposed gear sector 80, which meshes with a spur gear 81 on the previously described spindle 25 that carries air speed indicator hand 23. Arm 73 extending from sector member 75 is formed with a downward offset, as indicated in Fig. 2, so that link 71 passes with clearance below the gear sector. Gear 81 has a hub 82, to which is connected the inner end of a usual restoring coil spring 83, the outer end of said coil spring being anchored to a pin 84, as indicated in Fig. 3. Spring 83 is sufficiently weak that the resistance which it offers to extension of the bellows is negligible.

Figures 5, 6:
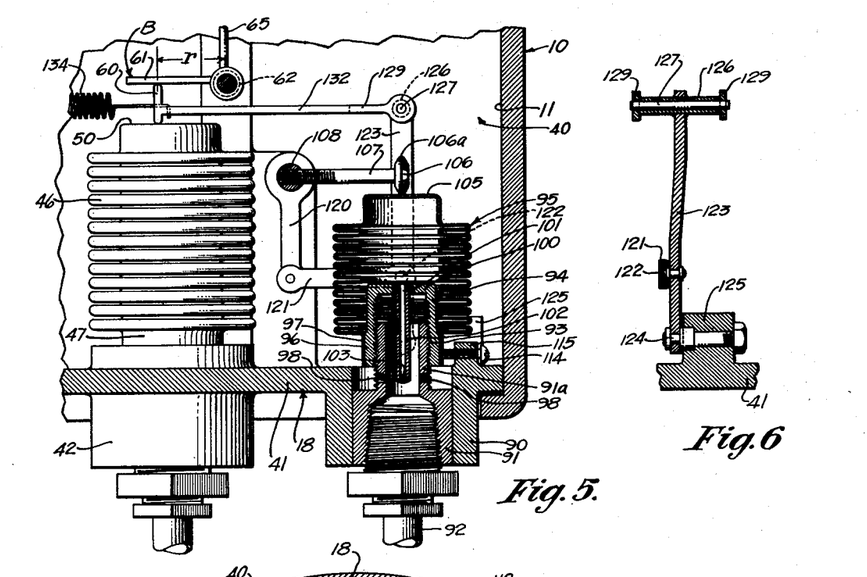
Fig. 5 is a detail section taken on line 5—5 of Fig. 4.
Fig. 6 is a detail section taken on line 6—6 of Fig. 4.

It will thus be understood that upward travel of bellows 46 with increase in velocity air pressure moves post 60 in a vertical direction to swing arms 61 and 65 in a right-handed direction, as viewed in Fig. 5. Such movement of arm 65, which is in engagement with pivoted arm 66, causes counter-clockwise movement of arm 66, as viewed in Fig. 3, and therefore movement of link 71 and arm 73 to swing gear sector 80 in a counter-clockwise direction. This causes rotation of gear 81 to move indicator hand 23 in a clockwise direction from its illustrated zero reading position, in a clockwise direction around its scale 35.

Attention is here directed to the fact that at the zero reading position of the instrument, sector arm 73 and its operating link 71 make an acute angle with one another, and that with increase in reading of the instrument, this angle between arm 73 and link 71 will increase. This means that the rotation imparted to gear sector 80 for a given increment of movement of link 71 will be greatest at the beginning end of the scale and will become less and less as the reading of the instrument increases, thereby compensating somewhat for the fact that the movement of the bellows and connected linkage members up to and including link 71 varies approximately as the square of the air speed. This provision therefore avoids crowding in the lower region of the indicating scale.

The lower wall 41 of casting 18 is formed with a second tubular portion 90, within which is press fitted a tubular adapter member 91 coupled at its lower end to the static air line 92. The upper end of adapter 91 is reduced in diameter and externally screwthreaded, as indicated at 93, and screwthreaded thereon is an internally screwthreaded cap 94. This cap 94 is received within the lower portion of a resilient diaphragm 95, having a linear law of expansion, preferably in the form of a bellows or Sylphon, the rounded lower portion 96 of member 94 being tightly received, in air tight relation, within the cylindrical lower end portion 97 of the bellows, as clearly indicated in Fig. 5. Air passages or ports 98 are drilled in the upper reduced portion 91a of adapter 91, these ports 98 opening below the lower end of cap 94, so as to establish communication between the interior of adapter 91 and chamber 40, within which both bellows 46 and 95 are located. Chamber 40 is thus in communication with static air line 92, and is therefore at static air pressure.

The upper end portion 100 of cap 94 is drilled with an opening 101 in which is tightly mounted a downwardly projecting tube 102. After bellows 95 and head 94 have been assembled together, the interior of the bellows is evacuated to a high vacuum by way of this tube 102, after which the lower end of the tube is plugged, as indicated at 103. The bellows accordingly stands in a somewhat contracted condition, such that its length will change with variations of static pressure in chamber 40.

The flat upper end 105 of bellows 95 engages the head 106 of a normally substantially horizontal pin 107 screwthreaded into a horizontal transversely extending shaft 108, the reduced ends 109 and 110 of which are mounted in bearings at 111 and 112, respectively, supported by casting 18. The linkage is adjustable by screwing member 96 carrying bellows 95 up or down on adapter member 91a. Member 96 is set in adjusted position by means of a set screw 114 screwthreaded in frame lug 115. The head 106 of pin 107 is tapered to form a peripheral edge 106a, so as to present substantially a knife edge to the flat upper end 105 of the bellows regardless of the position of adjustment of the pin. Thus, pin 107 may be screwed in or out with reference to shaft 108, thus varying its effective lever arm, and in whatever position of adjustment it may be left, engagement between head 106 and bellows end 105 is of a knife edge character. Provision is thus made for very accurate adjustment of the degree of rotation imparted to shaft 108 by a given movement of bellows end 105.

Tightly mounted on shaft 108 is a depending arm 120, to the lower end of which is pivotally connected one end of a link 121, which extends horizontally to a pivotal connection at 122 with an intermediate point on a vertically disposed lever 123, the lower end of which is pivotally mounted at 124 on a lug 125 extending upwardly from lower frame wall 41. The upper end of lever 123 is provided with a transversely extending hub 126, arranged in parallel relation to shaft 108, and rotatably mounted in said hub is a spindle 127 having secured to its extremities, adjacent the ends of the hub, the two arms 129 of a yoke formed on the end of a horizontally extending link 132. The arrangement is such that link 132, which extends at right angles from spindle 127, is disposed at right angles to the previously mentioned hub 62 carrying arms 61 and 65, and the forward end of this link 132 is integrally joined with the aforementioned vertical post 60, in the manner clearly illustrated in Fig. 5. Head 106 of pin 107 is held at all times in operative engagement with the upper end 105 of bellows 95 by means of a comparatively light tension spring 134 connected between link 132 and a post 135 set into casting lug 136.

It will now be understood that contraction or extension of bellows 105 will swing arm 107 and thereby effect movement of arm 120, link 121, lever arm 123, and link 132 to move post 60 toward or from the pivot axis of arms 61 and 65. This movement of post 60 changes the effective lever arm of arm or plate 61, thereby varying the movement of arm 65, and therefore the air speed reading of the instrument, in such a manner as to compensate for varying conditions of static pressure, as will be explained in more detail at a later point in the description.

Casting 18 has a vertical bore 140 which extends downwardly through a depending tubular extension 141, the vertical axis of said bore intersecting the horizontal axis of rotation of the aforementioned bell crank hub 62. Mounted in bore 140 is a tubular member 142, the lower end of which projects downwardly beyond the lower end of tubular extension 141. Member 142 has a closed lower end 145, centrally drilled to receive a small diameter tube 146 having a capillary bore 147. Tube 146, which may be of copper, reaches out to some point externally of the cabin of the aircraft, where it is provided with a copper coil 150 or any suitable equivalent containing a suitable thermometer fluid as alcohol. This coil 150, which may preferably be mounted on a wing of the aircraft, is subject to external temperature, and the fluid within the coil communicates with the instrument by way of tube 146 and effects a compensation for temperature changes in the manner now to be described.

Mounted on a shoulder 151 near the lower end of member 142 is a third resilient chamber 152, also in the form of a bellows or Sylphon, the lower end portion 153 of this bellows extending downwardly and fitting within, in fluid tight relation, a reduced bore 155 of member 142. Bellows 152 is provided with a closed upper end 156. Mounted within and nearly filling bellows 152 is a longitudinally extending cylindrical plug 157, the lower end of which is drilled with a bore 158 to receive the end of copper tubing 146. Above bore 158, plug 157 is formed throughout its length with a capillary tube 159 communicating with the capillary bore 147 of tube 146. The upper end of plug 157 is spaced a short distance below the upper end 156 of bellows 152, and the plug is spaced a short distance within the bellows, as illustrated in Fig. 2. The interior of the bellows, around plug 157, as well as bore 159, is filled with the same fluid that is contained in coil 150 and tube 146. The purpose of plug 157 is simply to reduce the volume of fluid within bellows 152, in order to minimize the effect of expansion of fluid within the bellows because of ambient temperature conditions at the instrument.

The upper end 156 of bellows 152 engages a head 160 slidable within the bore of tubular member 142, and provided with an upwardly extending stem 161. The bellows is made to travel in accordance with volume changes of the filling fluid by use of a compressional restraining spring 162 acting downwardly against head 160 and seating upwardly against an abutment 163 screwthreaded within the upper end of member 142. It may here be noted that at the break in Fig. 2, a section has been removed equal in length to about four coils of this spring 162. Abutment 163 is provided with a central bore 164 which slidably receives and guides the upper portion of stem 161.

At standard temperature, stem 61 stands in a certain predetermined position, with the pressure of spring 162 balanced against the column of liquid contained in the bellows. Post or stem 161 may be adjusted to this standard position by sliding the entire casing 142 up or down in bore 140, and locking in position by means of a packed locking nut 141a screwthreaded on the lower end of member 141. Change of temperature of coil 150 then varies the volume of the contained alcohol, causing fluid flow into or from bellows 152, as the case may be, with resultant vertical movement of the upper end 156 of the bellows and stem 161.

The upper end of stem 161 engages the underside of the swinging end of an angular, pivoted plate 170, the pivoted end of which is formed with a hub 171 rotatably mounted on a stud 172. This stud 172 is mounted on a pair of spaced washers 174 and 175 by means of a flange 176 and a nut 177, stud 172 passing through a comparatively large opening 178 in a lug 179 formed integrally with frame casting 18, and washers 174 and 175 engaging opposite flat faces of said lug. It will be evident that this construction enables the position of stud 172 to be adjusted in directions at right angles to its axis, the stud being set in proper adjusted position by tightening nut 177.

Figure 7:
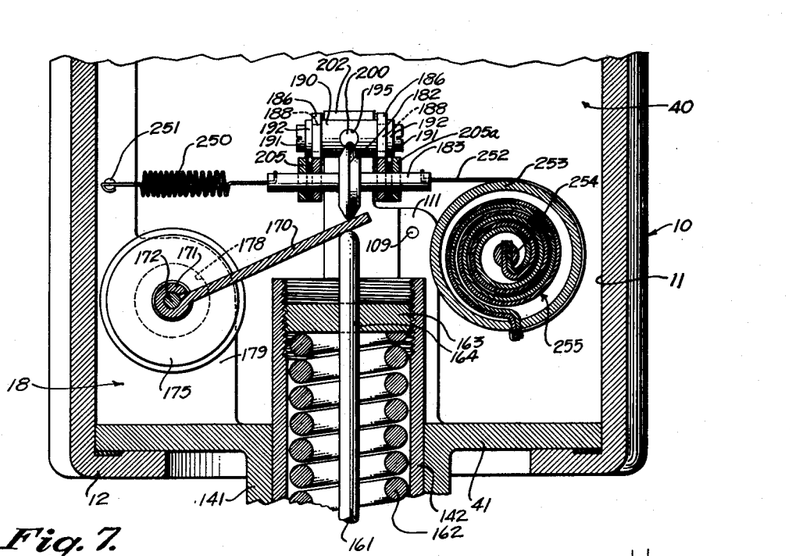
Fig. 7 is a section taken as indicated by line 7—7 of Fig. 4.
Figure 8:
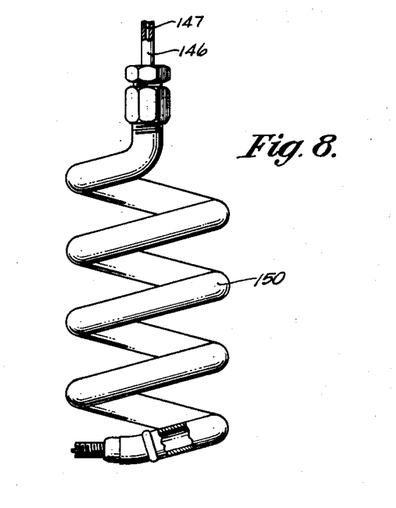
Fig. 8 is a view showing an external temperature measurement element and capillary line.

Engaging the upper side of the free end of angular plate 170 is a knife edge roller 182, fixed on a horizontal spindle 183, and rotatably mounted on spindle 183, and spaced from opposite sides of roller 182 as shown in Fig. 7, are the lower perforated ends of a pair of links 186, which extend upwardly at an angle as shown in Fig. 2 and are rotatably mounted at their upper ends on the reduced end portions 188 of a cross head 190. A pair of screws 191 are threaded into opposite ends of cross head 190 to hold washers 192 against end portions 188 of cross head 190 and to confine links 186 in assembly with the cross head. Cross head 190 is formed with a transverse bore 195 which receives the end portion of a horizontal shaft 200, which is guided for horizontal axial movement by means of a sliding fit within a bore 201 formed in frame wall 202. This shaft 200 is in axial alinement with the aforementioned bell crank hub 62, and forms a support for said hub as presently to be described.

Outside of links 186, there are rotatably mounted on shaft 183 the ends of a pair of yoke arms 205 and 205a, said arms being rotatably mounted on a horizontal pin 206 mounted in frame lug 207. It will be evident that the portions of arms 205 between pivot 206 and spindle 183, together with links 186, form a toggle mechanism which is operated by engagement of plate 170 (understood to be movable in accordance with vertical travel of stem 161) with knife edge roller 182 mounted on spindle 183 to move shaft 200 in an axial direction. The two arms 186 and 205 of the toggle are of the same length, and their upper pivotal connections are in horizontal alinement with one another.

Roller 182 and plate 170 form a part of an ambient temperature compensation means which is optionally but preferably employed. However, while such a compensation means is highly desirable, and in certain aspects forms a part of the present invention, yet the balance of the mechanism is operable without this compensation means, and will therefore first be described without consideration of said compensation means. Accordingly, the toggle arm connection pin 183 may be considered as moved vertically by stem 161, the optional intervention of members 170 and 182 being disregarded for the present.

Shaft 200 has adjacent the end of sleeve 62 an enlargement 215 formed with a conical bearing surface 216 engaging the end of hub 62 (see Fig. 2), the portion of shaft 200 beyond conical seating surface 216 being reduced to a diameter slightly less than the inside diameter of sleeve 62, as indicated. Beyond sleeve 62, shaft portion 200a is formed with a screwthreaded portion 214, and screwthreaded thereon is a nut member 217 formed with a conical surface 218 adapted to engage the other end of hub 62. Nut member 217 is set in adjusted position on the shaft by means of a lock nut 219. Conical nut member 217 is so adjusted that hub 62 is accurately centered by and freely rotatable on conical surfaces 216 and 218. Beyond threaded portion 214, shaft 200 has a still further reduced portion 220 slidably received in the bore 221 of a bearing member 222 screwed within the wall of casting 18. A spring 220a surrounding shaft portion 220 between bearing 222 and nut 219 acts to move shaft 200 toward the left as viewed in Fig. 2.

Hub 62 and arm 65 carried thereby are accordingly moved in a horizontal direction with shaft 200 in accordance with outside temperature changes causing vertical movement of bellows 152 and stem 161 to operate the described toggle mechanism and shaft 200. It will be observed from Fig. 3 that this movement is exactly parallel to the normal position of straight edge 66a of arm 66, so that, if arm 66 is in its normal zero air speed position of Fig. 3, travel of arm 65 along the edge 66a of arm 66 will not cause movement of arm 66 but will change the multiplying ratio between arms 65 and 66 due to shortening of the lever arm at which pin or arm 65 will act against arm 66 when said arm 65 swings forwardly about the axis of rotation of hub 62.

Attention is directed to the fact that arm 61 of bell crank B is made of sufficient width as to maintain its engagement with post 60 throughout the limit of its travel with shaft 200.

The operation of the instrument and the manner in which compensations are made for varying temperature and static pressure may now be described.

It has been explained that bellows 46 is under the differential control of velocity air pressure and static air pressure, and that variations in the differential of these pressures causes movement of the bellows, which is transmitted by the described linkage to the true air speed indicator hand. It has also been explained that to indicate true air speed, several compensations must be made, one of which is a compensation for varying static pressure. This compensation is made by varying the multiplying factor of bell crank B by changing the effective lever arm $r$ at which bell crank arm 61 operates, and this is accomplished by shifting the point at which the pressure of the bellows is applied to arm 61 by suitable movement of post 60 toward or from the pivot axis of bell crank B. The length of bellows 95 varies inversely with changes in static pressure. Within the limits of movement of the connecting linkage between bellows 95 and post 60, the motion transmitted to post 60, along a line of travel at right angles to the pivot axis of arm 61, is therefore substantially proportional to changes in static pressure, post 60 moving nearer the axis of arm 61 with reduction in static pressure, and withdrawing from said axis with increase in static pressure. The linkage between bellows 95 and post 60 is so designed and adjusted that, assuming the position illustrated in Fig. 5 to be standard pressure position, post 60 would be moved into alinement with the axis of bell crank B for zero static pressure. The distance between the point of engagement of post 60 with arm 61 and the axis of bell crank B, that is, the length of lever arm $r$, is accordingly directly proportional to static pressure, and it will therefore be evident that the multiplying factor of the linkage between bellows 46 and the indicating hand will be varied in inverse proportion to changes in static pressure.

The manner in which this compensation for $P_0$ is introduced may best be understood from a mathematical analysis.

The operation of the bellows 46 (the Pitot bellows) is represented by the equation $$P - P_0 = C_1 \Delta \qquad (3)$$

where $C_1$ is a constant depending upon the characteristics of bellows 46, and $\Delta$ is the linear deflection of the bellows for any given air speed.

The operation of bellows 95 (the static pressure bellows) in changing the effective lever arm length $r$ of bell crank arm 61 is represented by the equation $$P_0 = C_2 r \qquad (4)$$

where $C_2$ is a constant depending upon the characteristics of bellows 95 and the proportions of the linkage between said bellows and post 60.

Figure 5A:
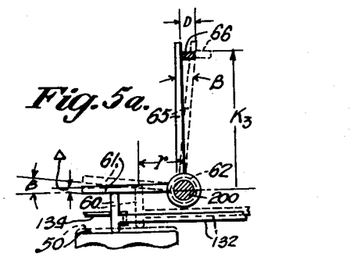
Fig. 5a is a detail similar to a portion of Fig. 5 showing an operative position in dotted lines.

Substituting in Equation 2 the values for $P-P_0$ and $P_0$ as given by Equations 3 and 4, there results $$C_1 \Delta = \frac{1}{2}\left[\left(\frac{K_1 C_2 r}{T}\right) V^2\right]\left[1 + \frac{K_2 V^2}{T}\right]$$

or $$\frac{\Delta}{r} = \tan \beta = \frac{1}{2}\left[\left(\frac{K_1 C_2}{C_1 T}\right) V^2\right]\left[1 + \frac{K_2 V^2}{T}\right] \qquad (5)$$

where $\beta$ is the angle of deflection of bell crank arm 61 (see Fig. 5a, showing in dotted lines a position of the members for a definite air speed, and indicating the relationships involved).

The corresponding deflection D (see Figs. 3 and 5a) of the point of engagement between bell crank arm 65 and edge 66a of pivoted arm 66 is given by the relation $$D = K_3 \tan \beta \qquad (6)$$

where $K_3$ is the displacement distance of the plane of motion of arm 66 above the axis of arm 65.

Combining Equations 5 and 6, there results $$D = \frac{1}{2} K_3 \left[\left(\frac{K_1 C_2}{C_1 T}\right) V^2\right]\left[1 + \frac{K_2 V^2}{T}\right] \qquad (7)$$

This equation gives the deflection distance D for any combination of $P_0$, T and V. $P_0$ does not appear in Equation 7, since the described variation in lever arm $r$ compensates for this factor. In other words, owing to the introduced compensation for $P_0$, the deflection distance D, instead of varying with different values of $P_0$, is the same for all values of $P_0$.

Attention is particularly drawn to the fact that at zero air speed (Fig. 5), bellows end 50 and arm 61 are parallel to one another and to the direction of travel of post 60, the position of which shifts horizontally with changes in static pressure. This means that for zero air speed, the position of arm 61 will be the same for all static pressures, and action of post 60 for variations of static pressure will not influence the zero reading of the indicating hand. At a definite air speed, however, arm 61 will be at a certain angle $\beta$ with reference to the direction of travel of post 60, and if a change in static pressure then occurs, the resultant travel of post 60 swings arm 61 in such an amount as to compensate for that pressure change.

The compensation for the effect of changes in absolute temperature T as the factor T appears in the term $$\left[\left(\frac{K_1 C_2}{C_1 T}\right) V^2\right]$$

of Equation 7 is made by moving bell crank B along its axis, so that a given deflection distance D will result in a greater or lesser angular deflections $\alpha$ of arm 66. It has been explained that the effect of temperature changes on external temperature coil 150 is an extension or contraction in the length of bellows 152, and a consequent vertical movement of stem 161, said stem rising with increasing temperature and lowering with falling temperature. Such movement of stem 161 imparts corresponding movement to the pivot connection 183 of toggle arms 186 and 205. The resulting action of said toggle arms is to cause a translation of shaft 200, and therefore of hub 62 of bell crank B, in such manner as to move bell crank arm 65 along straight edge 66a of pivoted arm 66. At zero air speed, bell crank arm 65 stands in a vertical position, and arm 66 stands in a position with its engagement edge 66a at right angles to arm 65, and in parallelism with the direction of axial travel of the hub 62 of arm 65. It follows that, at zero air speed, translation of arm hub 62 caused by changes in external temperature simply causes a translation of arm 65 along the edge 66a of arm 66, without imparting movement to said arm 66. The pivot axis 67 of arm 66 is so located with reference to the direction of temperature caused travel of arm 65 that arm 65 moves toward said pivot axis with increase in external temperature, and moves away from said pivot axis with decrease in external temperature, the lever arm $r_1$ with which arm 65 actuates arm 66 thus varying in length inversely with absolute temperature. Thus, $$r_1 = \frac{C}{T} \qquad (8)$$

where C is a constant. It will be evident that this action is in the direction called for by the factor T as it appears in the term $$\left[\left(\frac{K_1 C_2}{C_1 T}\right) V^2\right]$$

of Equation 7. Since, however, the length of lever arm $r_1$ must vary as the reciprocal of T, the external temperature compensation mechanism is designed to have a diminishing motion characteristic. That is to say, the external temperature compensation mechanism is given a characteristic such that equal increments of increasing absolute temperature result in lessening $r_1$ by diminishing increments of length, $r_1$ approaching zero length as T approaches infinity, as called for by Equation 8. As a typical means for introducing this diminishing motion characteristic, the toggle mechanism 186, 205 may be employed, being designed to impart to shaft 200, and therefore to bell crank hub 62, a diminishing movement with increasing temperature, of such character that the lever arm length $r_1$ varies substantially as the reciprocal of T for the design range of the instrument within the limits of instrumental error. Stem 161 of course travels in accordance with the cubical expansion of the filling media, which is not strictly linearly proportional to T, but varies in accordance with the relation $V_t = V_o (1+at+bt^2+ct^3)$. This departure from a linear characteristic is taken into account in the design of toggle mechanism 186, 205—in particular, in establishing the lengths of the toggle links and the positions of their pivot connections—and this is done in such a manner that bell crank hub 62 has a movement causing lever arm length $r_1$ to vary as the reciprocal of T within the limitations of the instrument. Arm 65 accordingly travels along the edge of arm 66 with a movement such as to vary the multiplying ratio of arm 66 substantially in direct proportion to absolute temperature T. It has previously been described how the multiplying ratio of the transmission between the velocity pressure bellows and the indicator is varied in inverse proportion to static air pressure. It will now be apparent that the separate static air pressure and external temperature compensation means act to vary the multiplying ratio of said transmission as the ratio of absolute temperature to static air pressure.

As pointed out above, the travel of arm 65 caused by temperature variations effects no movement of arm 66 at zero air speed, since under such condition the travel of arm 65 is parallel to arm edge 66a which it engages. The reading of the air speed indicator hand will accordingly always be zero for zero air speed, regardless of external temperature conditions, since the effect of temperature changes in such an instance is only to change the multiplying factor of arm 66. But for definite air speeds, arm 65 is tilted toward arm 66, moving said arm through an angle $\alpha$ with reference to the direction of temperature compensation travel of arm 65, and when arm 65 then moves along arm 66 by reason of change in external temperature, the angular deflection $\alpha$ of arm 66 is varied accordingly.

Figure 3A:
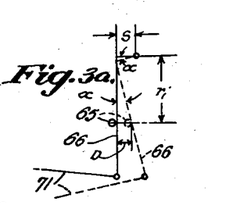
Fig. 3a is a kinematic diagram of certain members of the operating linkage appearing in Fig. 3.

If the term $$\left[1+\frac{K_2 V^2}{T}\right]$$

of Equation 7 could be neglected, the deflection angle of arm 66 (assuming arm 66 to be pivoted on an axis in line with arm edge 66a) would be an exact measure of V. Since, however, neglect of this term introduces a sensible error, the instrument is designed to take it into account, and in the illustrative embodiment this is accomplished, to close approximation, by offsetting the pivot axis of arm 66 by a distance s from arm edge 66a. This distance s may be arrived at as follows. From the trigonometry of Fig. 3a, $$D = r_1 \tan \alpha - s (\sec \alpha - 1) \quad (9)$$

Then, from Equations 7, 8 and 9

$$\frac{C}{T} \tan \alpha - s (\sec \alpha - 1) = \frac{1}{2} K_3 \left[\left(\frac{K_1 C_2}{C_1 T}\right) V^2\right]\left[1+\frac{K_2 V^2}{T}\right] \quad (10)$$

Using Equation 10, with numerical values for the several constants substituted, two sets of values for T and V are arbitrarily chosen, giving two simultaneous equations, which are then solved numerically for s.

This offset distance s may also be reached by a graphical solution, which consists in calculating the deflection distance D at different temperatures T for a series of air speeds V, using for this purpose Equation 7. Having determined several different points for different temperatures at a given air speed V, a straight line drawn therethrough will represent the required approximation position for arm edge 66a for all atmospheric temperature conditions at that air speed. Several such lines may be determined in this manner for different air speeds, all of which will represent different positions which must be assumed by arm edge 66a under the assumed conditions of air speed and temperature. It is now possible to find and draw a circle of fixed center to which all of the lines determined in the manner described are, to very close approximation, tangent. It will be evident that the center of this circle will determine the pivot axis of arm 66, and its radius will be the offset distance s of said pivot axis from straight arm edge 66a. Fig. 3 shows a proper offset distance s for an instrument of the proportions illustrated.

The indicator 23 of the instrument as described reads true air speed directly, being compensated for the factors $P_o$ and T as they appear in Equation 2.

Figure 4:
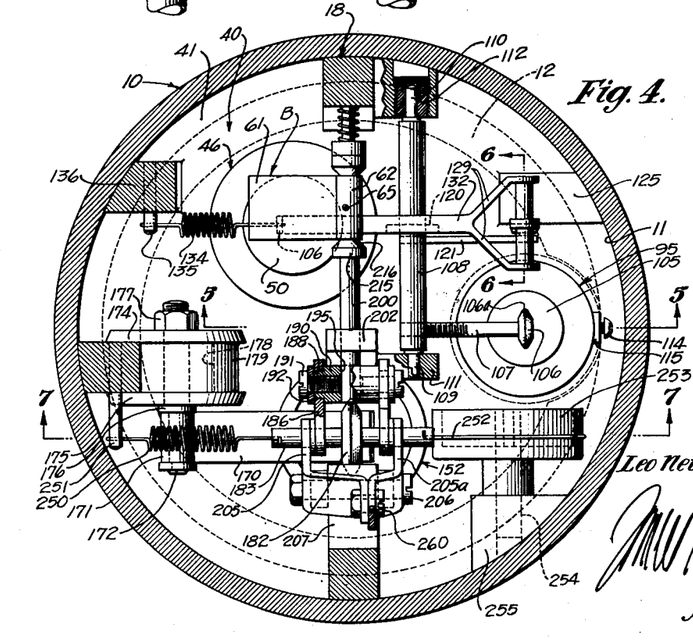
Fig. 4 is a cross section taken on broken line 4—4 of Fig. 2.

The ambient temperature compensation means, briefly referred to above, is shown best in Fig. 7, to which reference is now directed. Connected to one end of spindle 183 is one end of a tension spring 250, the other end of which is anchored at 251. Connected to the other end of spindle 183 is one end of a cable 252, which is wrapped partially around a drum 253 rotatably mounted on a fixed shaft 254 set into a lug 255 of casting 18, as indicated in Fig. 4. Disposed within drum 253 and connecting the drum and shaft 254 is a spiral bi-metallic element 255. As here illustrated, this bi-metallic element is so arranged as to wind tighter, causing counter-clockwise rotation of drum 253, as viewed in Fig. 7, with increase in temperature, and to unwind, causing reverse rotation of drum 253, with decrease in temperature. The temperature influencing bi-metallic element 255 is of course the ambient temperature of the instrument, for which compensation is to be made. Drum 253 is so mounted that its rotation in one direction or the other with changes in instrument temperature causes axial translation of spindle 183 and knife-edge roller 182 carried thereby. The arrangement of parts is such that for an assumed minimum instrument temperature, bi-metallic instrument 255 maintains the center of knife-edge roller 182 in alinement with the center of stem 161, as indicated in Fig. 7. With increase in instrument temperature, drum 253 rotates in a counter-clockwise direction, whereupon spring 250 moves roller 182 toward the left, as viewed in Fig. 7. This permits toggle arms 186 and 205 to lower, under the influence of spring 220a, until roller 182 is again in engagement with angular plate 170. Arm hub 62 is accordingly moved by shaft 200 in a left-handed direction, as viewed in Fig. 2, thus effecting a temperature correction. Thus, if the temperature of the instrument should be such as to cause an expansion of the fluid within bellows 152, tending to cause movement of the linkage such as to shift arm hub 62 a distance toward the right (Fig. 2) beyond its proper position, this tendency for overtravel of the linkage is compensated by movement of toggle roller 182 toward the left and down, as viewed in Fig. 7, roller 182 assuming a new position offset toward the left from its original position, and lowered to maintain its engagement with angular plate 170.

Now it will be evident that the amount of ambient expansion of the bellows which must be compensated in any given case depends upon the amount of fluid within the bellows. In other words, at relatively high external temperatures, there is more fluid within the bellows, and therefore more expansion due to ambient effect, than at relatively low temperatures when there is less fluid within the bellows. This factor is taken into account by the changing angularity of plate 170 with different heights of bellows-operated stem 161. Thus, at low external temperature, stem 161 will stand in a lowered position, and the angularity of plate 170 will be such that roller 182 will lower along said plate with rising instrument temperature at just the proper rate to compensate for the extension of the bellows due to that rising instrument temperature. At higher external temperature, however, more fluid will be within the bellows, with post 161 standing higher than before and with the inclination of plate 170 correspondingly increased. And because of the increased volume of fluid within the instrument, extension of the bellows for a given rise in instrument temperature will then be greater than before, which however is compensated by a greater drop of roller 182 because of the increased steepness of plate 170. This compensation means thus compensates for all ambient temperature effects at the instrument. It will be evident that the action is to vary the effective length of the linkage between the resilient chamber and the hub of bell crank B in inverse proportion to the product of the internal temperature of the instrument and the volume of fluid within the chamber. The diameter of the bore of capillary tube 147 is made sufficiently small relative to the diameter of bellows 152 that the ambient temperature effect of the capillary tube itself is negligible.

The instrument is preferably provided with a compensated temperature indicator, as now to be described. The previously mentioned yoke arms 205 and 205a are secured together above pivots 206 by means of a screw 260, and yoke arm 205a is extended above this screw so as to engage a gear sector member 270 pivotally mounted on a shaft 271 having bearing in plates 20 and 28. This gear sector meshes with a spur gear 274 on the aforementioned shaft 31 carrying temperature indicator 24. Shaft 31 is provided with a spiral restoring spring 275 anchored on a post 276. It will be evident that the reading of temperature indicator 24 will be compensated for ambient temperature effect at the instrument, and will therefore read the true external temperature.

The present invention is primarily referred to herein as an air speed indicator for aircraft. However, no limitation to use in connection with aircraft in flight is to be implied; for example, if the aircraft is stationary on the ground, the instrument installed thereon will quite obviously indicate wind velocity relative to the ground. And no limitation is to be implied against any type of equivalent use wherein the governing equations and fundamental laws as herein given, and on which the functions of the instrument are based, will apply.

It is to be understood that the drawings and description are merely illustrative rather than restrictive on the present invention, and that various changes in design, structure and arrangement may be made without departing from the spirit and scope of the invention or of the appended claims.

I claim:

1. In an air speed indicator, the combination of differential pressure operated means movable in response to the differential of velocity air pressure and static air pressure, indicating means, an operative linkage interconnecting said differential pressure operated means and said indicating means, said operative linkage including a pair of levers, static pressure compensation means associated with one of said levers, including operating means movable in response to varying static air pressure and independently of temperature, for varying the multiplying ratio of said lever in inverse proportion to varying static air pressure, and temperature compensation means associated with the other of said levers, including operating means movable in response to varying external absolute temperature, for varying the multiplying ratio of said other lever in direct proportion to varying external absolute temperature.

2. In an air speed indicator, the combination of differential pressure operated means movable in response to the differential of velocity air pressure and static air pressure, indicating means, an operative linkage interconnecting said differential pressure operated means and said indicating means, said operative linkage including a pair of levers, static pressure compensation means associated with one of said levers, including operating means movable in response to varying static air pressure, for varying the effective length of the arm at which force is applied to said lever proportionately to varying static air pressure, and temperature compensation means associated with the other of said levers, including operating means movable in response to varying external absolute temperature, for varying the effective length of the arm at which force is applied to said other lever proportionately to the reciprocal of varying external absolute temperature.

3. An air speed indicator comprising an operating element movable in response to the differential of velocity air pressure and static air pressure, an indicating element, a variable multiplying ratio transmission operatively interconnecting said operating and indicating elements, and air density compensation means comprising separate static air pressure and temperature responsive operating elements operatively interconnected with said transmission in a manner to vary the multiplying ratio of said transmission as the ratio of absolute temperature to static air pressure, said transmission including means effective to correct the final multiplying ratio of said transmission in accordance with a multiplying factor equal to $$\left(1+\frac{KV^2}{T}\right)$$

where V is true air speed, T is absolute temperature of the air, and K is a constant equal to $$\frac{\rho_s T_s}{4\gamma P_s}$$

where $\rho_s$ is the density of air at standard temperature $T_s$ and standard pressure $P_s$, and $\gamma$ is the ratio of the specific heat of air at constant pressure to the specific heat of air at constant volume.

4. In an air speed indicator, the combination of differential pressure operated means movable in response to the differential of velocity air pressure and static air pressure, indicating means, an operative linkage interconnecting said differential pressure operated means and said indicating means, said operative linkage including a pair of levers, static pressure compensation means associated with one of said levers, including operating means movable in response to varying static air pressure, for varying the effective length of the arm at which force is applied to said lever proportionately to varying static air pressure, and temperature compensation means associated with the other of said levers, including operating means movable in response to varying external absolute temperature, for varying the effective length of the arm at which force is applied to said other lever proportionately to the reciprocal of varying external absolute temperature, said linkage including means supporting that lever with which the temperature compensation means is associated for movement effective to correct the final multiplying ratio of said linkage substantially in accordance with the factor $$\left(1+\frac{KV^2}{T}\right)$$

where V is true air speed, T is absolute temperature of the air, and K is a constant equal to $$\frac{\rho_s T_s}{4\gamma P_s}$$

where $\rho_s$ is the density of air at standard temperature $T_s$ and standard pressure $P_s$ and $\gamma$ is the ratio of the specific heat of air at constant pressure to the specific heat of air at constant volume.

5. In an air speed indicator, the combination of differential pressure operated means movable in response to the differential of velocity air pressure and static air pressure, indicating means, an operative linkage interconnecting said differential pressure operated means and said indicating means, said operative linkage including a pair of levers, static pressure compensation means associated with one of said levers, including operating means movable in response to varying static air pressure, for varying the effective length of the arm at which force is applied to said lever proportionately to varying static air pressure, said operating means embodying a highly evacuated resilient linearly expansive chamber subjected exteriorly to static air pressure, and temperature compensation means associated with the other of said levers, including operating means movable in response to varying external absolute temperature, for varying the effective length of the arm at which force is applied to said other lever proportionately to the reciprocal of varying external absolute temperature.

6. In an air speed indicator, the combination of differential pressure operated means movable in response to the differential of velocity air pressure and static air pressure, indicating means, an operative linkage interconnecting said differential pressure operated means and said indicating means, said operative linkage including a pair of levers, static pressure compensation means associated with one of said levers, including operating means movable in response to varying static air pressure, for varying the multiplying ratio of said lever in inverse proportion to varying static air pressure, and temperature compensation means associated with the other of said levers, including operating means movable in response to varying external absolute temperature, for varying the multiplying ratio of said other lever in direct proportion to varying external absolute temperature, said last mentioned operating means embodying an expansive chamber and an external tube containing thermometer fluid.

7. In an air speed indicator, a member movable in response to the differential of velocity air pressure and static air pressure, indicator means, an operative linkage between said member and said indicator means, said linkage including a pivoted lever arm, motion transmitting means arranged to receive motion from said member and engaging said arm to impart movement thereto, said motion transmitting means being movable along said arm to vary the effective lever arm length of said arm, means operating in response to varying static air pressure and independently of variations in temperature for moving said motion transmitting means along said arm in a manner to vary the lever arm distance between the pivot axis of said lever arm and the point of engagement of said motion transmitting means with said arm proportionately to static air pressure, a second pivoted lever arm and a member operatively engaging it included in said linkage, said last mentioned member being movable in a manner to swing said second lever arm about its axis, and said last mentioned member being also movable along a direction line at right angles to the pivot axis of the second mentioned lever arm to vary its point of engagement with said second lever arm and thereby vary the effective length of said second lever arm, and means operating in response to external temperature for translating said member along said direction line in a manner to vary the effective length of said second lever arm proportionately to the reciprocal of varying external absolute temperature.

8. In an air speed indicator, a member movable in response to the differential of velocity air pressure and static air pressure, indicator means, an operative linkage between said member and said indicator means, said linkage including a lever limitedly movable along its pivot axis and having a swinging operating arm, motion transmitting means between said member and said arm, said motion transmitting means being movable against said arm to govern the angular position of said arm, and being also movable along said arm in a direction substantially parallel to the position assumed by said arm when the differential of velocity air pressure and static air pressure is zero, means responsive to static air pressure governing the position of said motion transmitting means along said arm, so as to vary the multiplying ratio of said arm inversely with static pressure, a second lever in said linkage having an arm operatively engaged by an arm of said first mentioned lever, said arm of said second mentioned lever being pivoted on an axis which is in a plane at right angles to the axis of said first mentioned lever, and said arm of said second mentioned lever being parallel to the axis of the first mentioned lever for zero differential of velocity and static air pressures, axial travel of said first mentioned lever causing its arm in engagement with said arm of said second mentioned lever to move along the length thereof, and means responsive to external temperature for governing the position of said first mentioned lever along its pivot axis, in such manner as to vary the multiplying ratio of the second mentioned lever in direct proportion to varying absolute temperature.

9. A combination as defined in claim 8, in which the arm of the second mentioned lever is engaged along a substantially straight line by the arm of the first mentioned lever, and in which the pivot axis of the second mentioned lever is offset from said substantially straight line in the same direction in which said arm of the first mentioned lever acts against said arm of the second mentioned lever with increasing differential of velocity air pressure and static air pressure.

10. In an air speed indicator, a member movable in response to the differential of velocity air pressure and static air pressure, indicator means, an operative linkage between said member and said indicator means, said linkage including a pivoted lever arm and motion transmitting means for transmitting motion between said member and said lever arm to vary the multiplying ratio between said member and lever arm, and means operating in response to varying external absolute temperature for moving said motion transmitting means along said arm toward or from the pivot axis of the arm in accordance with increase or decrease, respectively, in external absolute temperature, said last mentioned means comprising a resilient expansive chamber and an external tube connecting therewith filled with thermal-expansive fluid, said chamber having a wall movable with expansion and contraction of said fluid, and a linkage between said movable wall and said motion transmitting means, said last named linkage including a toggle mechanism embodying a pair of pivotally connected toggle arms, the pivotal connection of said toggle arms being arranged for movement in accordance with the expansion and contraction of said chamber, a pivotal mounting for the other end of one of said toggle arms, and means operatively connecting the other end of the other of said toggle arms and said motion transmitting means in a manner to move said motion transmitting means along said pivoted lever arm.

11. In an air speed indicator, the combination of a bellows fixed at one end and having a movable end portion, said bellows adapted to contain air at velocity air pressure and to be subjected exteriorly to static air pressure, an element associated and moving with the movable end portion of said bellows disposed in a plane at right angles to the direction of expansion and contraction of said bellows, a pivoted bell crank having its pivot axis parallel to said plane and having an arm adapted to take a normal position parallel to said plane, a motion transmitting member engaging said element and said bell crank arm and arranged for adjustment movement toward and from the pivot axis of said bell crank, said bellows and arm interconnected by said motion transmitting member being parallel to one another when air pressure inside and outside of said bellows are equal, means responsive to static air pressure governing the position of said motion transmitting member along said arm, so as to vary the multiplying ratio of said arm inversely with static air pressure, said bell crank being limitedly movable along its axis and its said one arm being of sufficient width to maintain its engagement with said motion transmitting member through such movement of the bell crank, a second arm on said bell crank, a swinging arm operatively engaged by said second bell crank arm pivoted on an axis which is in a plane at right angles to the direction of the bell crank axis, whereby axial travel of said bell crank causes said second bell crank arm to move along the length of said last mentioned pivoted arm, said last mentioned pivoted arm assuming a position parallel to the axis of said axially movable bell crank when pressures inside and outside of said bellows are equal, means responsive to absolute temperature for governing the axial position of said bell crank, in such sense as to vary the multiplying ratio between said second bell crank arm and said swinging arm proportionately to absolute temperature, and indicating means operated by said swinging arm.

12. A combination as defined in claim 11, in which the axis of the swinging arm is offset from the line along which said arm is engaged by the second arm of the bell crank, in the same direction in which said swinging arm is engaged by the bell crank arm.

13. In an air speed indicator, the combination of a hollow instrument casing, a resilient bellows within said casing fixed at one end within said casing and having a movable closed end portion, said bellows having a connection admitting air at velocity air pressure, the interior of said casing having a connection admitting air at static air pressure, an element associated and moving with the movable end portion of said bellows disposed in a plane at right angles to the direction of expansion and contraction of said bellows, a pivoted bell crank having its axis parallel to said plane and having an arm adapted to take a normal position parallel to said plane, a motion transmitting member engaging said element and said bell crank arm and arranged for adjustment movement toward and from the pivot axis of said bell crank, said bellows and arm interconnected by said motion transmitting member being parallel to one another when air pressures inside and outside of said bellows are equal, means responsive to static air pressure comprising an evacuated bellows within said casing and a linkage connected between said bellows and said motion transmitting member so as to move the latter along said arm to vary the multiplying ratio thereof inversely with static pressure, said bell crank being limitedly movable along its axis and its said one arm being a sufficient width to maintain its engagement with said motion transmitting member throughout such movement of the bell crank, a second arm on said bell crank, a swinging arm operatively engaged by said second bell crank arm pivoted on an axis which is in a plane at right angles to the direction of the bell crank axis, whereby axial travel of said bell crank causes said second bell crank arm to move along the length of said last mentioned pivoted arm, said last mentioned pivoted arm assuming a position parallel to the axis of said axially movable bell crank when pressures inside and outside the first mentioned bellows are equal, means responsive to absolute temperature for governing the axial position of said bell crank, in such sense as to increase the multiplying ratio of said swinging arm with absolute temperature, said last mentioned means comprising a resilient bellows within said casing and a communicating external tube filled with thermal-expansive fluid, a diminishing-motion linkage connected between said bellows and said bell crank, said linkage transmitting diminishing motion with increasing temperature, in such manner that the effective lever arm length of said swinging arm varies as the reciprocal of absolute temperature, and an indicator operated by said swinging arm.

14. A combination as defined in claim 13, in which the axis of the swinging arm is offset from the line along which said arm is engaged by the second arm of the bell crank, in the same direction in which said swinging arm is engaged by the bell crank arm.

15. In an air speed indicator, a member movable in response to the differential of velocity air pressure and static air pressure, indicator means, an operative linkage between said member and said indicator means, said linkage including a pivoted arm and a motion transmitting member operatively engaging said pivoted arm and movable toward and from said arm to vary the angular deflection of said arm, and means operating in response to varying external absolute temperature for moving said motion transmitting member along said arm toward or from the pivot axis of the arm in accordance with increase or decrease, respectively, in external absolute temperature, said last mentioned means comprising an expansive chamber and an external tube connecting therewith filled with thermal-expansive fluid, said chamber having a wall movable with expansion and contraction of said fluid, a linkage between said movable wall of said chamber and said motion transmitting member, and means connected in said linkage for varying the effective length of said linkage to compensate ambient temperature conditions at the instrument.

16. In an air speed indicator, the combination of differential pressure operated means movable in response to the differential of velocity air pressure and static air pressure, indicating means, an operative linkage interconnecting said differential pressure operated means and said indicating means, said operative linkage including lever means having two lever arms of variable effective lengths, static pressure compensating means, including operating means movable in response to varying static air pressure, for varying the effective length of one of said lever arms in direct proportion to static pressure, and temperature compensating means, including operating means movable in response to varying absolute temperature, for varying the effective length of the other of said lever arms as the reciprocal of absolute temperature.

17. In an air speed indicator, the combination of differential pressure operated means movable in response to the differential of velocity air pressure and static air pressure, indicating means, an operative linkage interconnecting said differential pressure operated means and said indicating means, said operative linkage embodying lever means including two pivoted lever arms of variable effective lengths, static pressure compensating means, including operating means movable in response to varying static air pressure, for varying the effective length of one of said lever arms in direct proportion to static pressure, and temperature compensating means, embodying temperature responsive means movable with changing absolute temperature, and motion transmitting means operated by said temperature responsive means for varying the effective length of the other of said lever arms in a sense opposite to changing temperature, said motion transmitting means including means for progressively diminishing the motion transmitted with increasing temperature, in such manner that the effective length of said last mentioned lever arm varies substantially as the reciprocal of absolute temperature.

18. In an air speed indicator, the combination of differential pressure operated means movable in response to the differential of velocity air pressure and static air pressure, indicating means, an operative linkage interconnecting said differential pressure operated means and said indicating means, said operative linkage including a pair of lever arms arranged in tandem, static pressure compensation means associated with one of said lever arms, including operating means movable in response to varying static air pressure for varying the effective length of the arm at which force is applied to said lever arm in direct proportion to static air pressure, and temperature compensation means associated with the other of said lever arms, embodying temperature responsive means movable with changing absolute temperature, and motion transmitting means operated by said temperature responsive means for varying the effective length of the arm at which force is applied to said other lever arm in a sense opposite to changing temperature, said motion transmitting means including means for progressively diminishing the motion transmitted with increasing temperature, in such manner that the effective length of said last mentioned lever arm varies substantially as the reciprocal of absolute temperature.

19. In an air speed indicator, a member movable in response to the differential of velocity air pressure and static air pressure, indicator means, an operative linkage between said member and said indicator means, said linkage including a pivoted lever arm, motion transmitting means arranged to receive motion from said member and engaging said lever arm to impart motion thereto, said motion transmitting means being movable along said arm to vary the effective lever arm length of said arm, means operating in response to varying static air pressure and independently of variations in temperature for moving said motion transmitting means along said arm in a manner to vary the lever arm distance between the pivot axis of said lever arm and the point of engagement of said motion transmitting means with said arm proportionately to static air pressure, said linkage including another pivoted lever arm, arranged in tandem with the first mentioned lever arm, and a member operatively engaging said other lever arm and movable to move said arm about its pivot axis, said last mentioned member being also movable along a direction line which is in a plane at right angles to said pivot axis to vary its point of engagement with said lever arm and thereby vary the effective length of said lever arm, and temperature compensation means operating in response to external temperature for translating said motion transmitting member along said direction line in such a sense as to decrease the effective length of said last named lever arm with increasing temperature, said temperature compensation means including a diminishing motion transmitting mechanism adapted to diminish the increments of translation imparted to said motion transmitting member with equal increments of increasing temperature, in such manner that the effective length of said lever arm varies as the reciprocal of absolute temperature.

20. In an air speed indicator, a member movable in response to the differential of velocity air pressure and static air pressure, indicator means, an operative linkage between said member and said indicator means, said linkage including a pivoted bell crank having an operating arm, motion transmitting means arranged to receive motion from said member and engaging said arm to impart motion thereto, said motion transmitting means being movable along said arm to vary the effective lever arm length of said arm, means operating in response to varying static air pressure and independently of variations in temperature for moving said motion transmitting means along said arm in a manner to vary the lever arm distance between the pivot axis of said bell crank and the point of engagement of said motion transmitting means with said arm proportionately to static air pressure, said bell crank being limitedly movable along its pivot axis without breaking the engagement of said bell crank arm with said motion transmitting means, a second arm on said bell crank, a swinging arm operatively engaged by said second bell crank arm, said swinging arm pivoted on an axis which is in a plane at right angles to the axis of said bell crank, in such manner that axial travel of said bell crank causes said second bell crank arm to move along the length of said swinging arm, said swinging arm assuming a position parallel to the axis of said bell crank for zero differential of velocity and static air pressures, and temperature compensation means responsive to external temperature for translating said bell crank along its pivot axis, said temperature compensation means translating said bell crank toward the pivot axis of said swinging arm with increase in temperature and from said axis with decrease in temperature, and said temperature compensation means having a diminishing motion transmitting characteristic, such that diminishing increments of translation are imparted to said bell crank with equal increments of increasing absolute temperature, in such manner that the effective lever arm length of said swinging arm varies as the reciprocal of absolute temperature.

21. In an air speed indicator, the combination of a bellows fixed at one end and having a movable end portion, said bellows adapted to contain air at velocity air pressure and to be subjected exteriorly to static air pressure, an element associated and moving with the movable end portion of said bellows disposed in a plane at right angles to the direction of expansion and contraction of said bellows, a pivoted bell crank having its pivot axis parallel to said plane and having an arm adapted to take a normal position parallel to said plane, a motion transmitting member engaging said element and said bell crank arm and arranged for adjustment movement toward and from the pivot axis of said bell crank, said bellows and arm interconnected by said motion transmitting member being parallel to one another when air pressures inside and outside of said bellows are equal, means responsive to static air pressure governing the position of said motion transmitting member along said arm, so as to vary the multiplying ratio of said arm inversely with static air pressure, said bell crank being limitedly movable along its pivot axis without breaking the engagement of said bell crank arm with said motion transmitting means, a second arm on said bell crank, a swinging arm operatively engaged by said second bell crank arm pivoted on an axis which is in a plane at right angles to the direction of the bell crank axis, whereby axial travel of said bell crank causes said second bell crank arm to move along the length of said last mentioned pivoted arm, said last mentioned pivoted arm assuming a position parallel to the axis of said axially movable bell crank when pressures inside and outside of said bellows are equal, means responsive to absolute temperature for governing the axial position of said bell crank, in such manner as to vary the effective lever arm length of said swinging arm proportionately to the reciprocal of absolute temperature, and indicating means operated by said swinging arm.

22. In an air speed indicator, the combination of differential pressure operated means movable in response to the differential of velocity air pressure and static air pressure, indicating means, an operative linkage interconnecting said differential pressure operated means and said indicating means, said operative linkage embodying lever means including two pivoted lever arms of variable effective lengths arranged in tandem, said lever arms assuming predetermined zero deflection positions on their respective pivot axes when the differential of velocity air pressure and static air pressure is zero, and each of said lever arms having an operative connection forming an element in said operative linkage which is slidably movable along the length of its corresponding arm along a direction line which is always parallel to the zero deflection position of said arm, whereby movement of either of said operative connections along its corresponding lever arm varies the deflection of said arm only when the arm is in a position of initial sensible deflection from its said predetermined zero deflection position, static pressure compensating means, including operating means movable in response to varying static pressure, for translating the operative connection associated with one of said lever arms along its said direction line in parallelism with the zero deflection position of said lever arm, in such a manner that the effective length of said arm from its pivot axis to said operative connection varies directly with static pressure, and temperature compensating means, embodying an element movable in response to temperature, and motion transmitting means operatively interconnecting said element with said operative connection associated with the other of said lever arms, for translating said last named operative connection along its said direction line in parallelism with the zero deflection position of the associated lever arm, in such a manner as to vary the effective length of said last named lever arm from its pivot axis to said operative connection in a sense opposite to changing temperature, said motion transmitting means having a diminishing motion characteristic such that said length of said last named lever arm varies as the reciprocal of absolute temperature.

23. In an air speed indicator, the combination of differential pressure operated means movable in response to the differential of velocity air pressure and static air pressure, indicating means, an operative linkage interconnecting said differential pressure operated means and said indicating means, said operative linkage including a pair of lever arms arranged in tandem, said lever arms assuming predetermined zero deflection positions on their respective pivot axes when the differential of velocity air pressure and static air pressure is zero, and each of said lever arms having an operative connection forming an element in said operative linkage which is slidably movable along the length of its corresponding arm along a direction line which is always parallel to the zero deflection position of said arm, whereby movement of either of said operative connections along its corresponding lever arm varies the deflection of said arm only when the arm is in a position of initial sensible deflection from its said predetermined zero deflection position, static pressure compensating means, including operating means movable in response to varying static pressure, for translating the operative connection associated with one of said lever arms along its said direction line in parallelism with the zero deflection position of said lever arm, in such a manner that the effective length of said arm from its pivot axis to said operative connection varies directly with static pressure, and temperature compensating means, embodying an element movable in response to temperature, and motion transmitting means operatively interconnecting said element with said operative connection associated with the other of said lever arms, for translating said last named operative connection along its said direction line in parallelism with the zero deflection position of the associated lever arm, in such a manner as to vary the effective length of said last named lever arm from its pivot axis to said operative connection in a sense opposite to changing temperature, said motion transmitting means having a diminishing motion characteristic such that said length of said last named lever arm varies as the reciprocal of absolute temperature.

24. In an air speed indicator, the combination of differential pressure operated means movable in response to the differential of velocity air pressure and static air pressure, indicating means, an operative linkage interconnecting said differential pressure operated means and said indicating means, said operative linkage including a pair of lever arms arranged in tandem, said lever arms assuming predetermined zero deflection positions on their respective pivot axes for zero differential of velocity and static air pressures, and each of said lever arms having an operative connection forming an element in said operative linkage by which force is applied to said arm by movement against said arm, said operative connection also being slidably movable along the length of the associated arm in a direction parallel to said zero deflection position of the arm, whereby movement of either of said operative connections along its corresponding lever arm varies the deflection of said arm only when the arm is in a position of initial sensible deflection from its said predetermined zero deflection position, static pressure compensating means, including operating means movable in response to varying static pressure, for translating the operative connection associated with one of said lever arms in said direction in parallelism with the zero deflection position of said lever arm, in such a manner that the effective length of said arm from the point of application of force to said arm by said operative connection to the pivot axis of said lever arm varies directly with static pressure, and temperature compensating means, embodying an element movable in response to temperature, and motion transmitting means operatively interconnecting said element with the said operative connection associated with the other of said lever arms, for translating said last named operative connection in said direction in parallelism to the zero deflection position of said other lever arm, in such manner as to vary the effective length of said other lever arm from the point of application of force to said arm by said associated operative connection to the pivot axis of said arm in a sense opposite to changing temperature, said motion transmitting means having a diminishing motion characteristic such that said length of said last named lever arm varies as the reciprocal of absolute temperature.

25. A combination as defined in claim 24, in which the last named lever arm has a straight edge engaged by the associated operative connection and in which the pivot axis of said lever arm is offset from said straight edge in the same direction in which said operative connection acts against said lever arm with increasing differential of velocity and static air pressures.

26. In an air speed indicator, a member movable in response to the differential of velocity air pressure and static air pressure, indicator means, an operative linkage between said member and said indicator means, said linkage including a pivoted lever arm having a predetermined zero deflection position for zero differential of velocity and static air pressures, motion transmitting means arranged to receive motion from said member and engaging said lever arm to impart motion thereto, said motion transmitting means being movable along said arm in a direction parallel to the zero deflection position of said arm to vary the effective lever arm length of said arm, means operating in response to varying static air pressure and independently of variations in temperature for moving said motion transmitting means along said arm in parallelism to the zero deflection position of said arm in a manner to vary the lever arm distance between the pivot axis of said lever arm and the point of engagement of said motion transmitting means with said arm proportionately to static air pressure, said linkage including another pivoted lever arm, arranged in tandem with the first mentioned lever arm, and having a predetermined zero deflection position for zero differential of velocity and static air pressures, and a swinging arm pivoted on an axis parallel to said zero deflection position of said other lever arm and adapted to move pivotally on its axis to engage and operate said other lever arm about the pivot axis of said lever arm, said swinging arm being also movable along its own pivot axis to vary its point of engagement with said lever arm and thereby vary the effective length of said lever arm, and temperature compensation means operating in response to external temperature for translating said swinging arm along its said axis in such a sense as to decrease the effective length of said last named lever arm with increasing temperature, said temperature compensation means including a diminishing motion transmitting mechanism adapted to diminish the increments of translation imparted to said swinging arm with equal increments of increasing temperature, in such manner that the effective length of said lever arm varies as the reciprocal of absolute temperature.

27. A combination as defined in claim 26, in which the last named lever arm has a straight edge engaged by said swinging arm and in which the pivot axis of said lever arm is offset from said straight edge in the same direction in which said swinging arm acts against said lever arm with increasing differential of velocity and static air pressures.

28. In an air speed indicator, the combination of differential pressure operated means movable in response to the differential of velocity air pressure and static air pressure, indicating means, an operative linkage interconnecting said differential pressure operated means and said indicating means, said operative linkage embodying lever means including two pivoted lever arms of variable effective lengths, static pressure compensating means, including operating means movable in response to varying static air pressure, for varying the effective length of one of said lever arms in direct proportion to static pressure, and temperature compensating means, embodying temperature responsive means movable with changing absolute temperature, and motion transmitting means operated by said temperature responsive means for varying the effective length of the other of said lever arms in a sense opposite to changing temperature, said motion transmitting means including means for progressively diminishing the motion transmitted with increasing temperature, in such manner that the effective length of said last mentioned lever arm varies substantially as the reciprocal of absolute temperature, said linkage including means effective to correct the final multiplying ratio of said transmission in accordance with a multiplying factor equal to $$\left(1+\frac{KV^2}{T}\right)$$

where V is true air speed, T is absolute temperature of the air, and K is a constant equal to $$\frac{\rho_s T_s}{4\gamma P_s}$$

where $\rho_s$ is the density of air at standard temperature $T_s$ and standard pressure $P_s$, and $\gamma$ is the ratio of the specific heat of air at constant pressure to the specific heat of air at constant volume.

29. In an air speed indicator, the combination of differential pressure operated means movable in response to the differential of velocity air pressure and static air pressure, indicating means, an operative linkage interconnecting said differential pressure operated means and said indicating means, said operative linkage including a pair of lever arms arranged in tandem, static pressure compensation means associated with one of said lever arms, including operating means movable in response to varying static air pressure for varying the effective length of the arm at which force is applied to said lever arm in direct proportion to static air pressure, and temperature compensation means associated with the other of said lever arms, embodying temperature responsive means movable with changing absolute temperature, and motion transmitting means operated by said temperature responsive means for varying the effective length of the arm at which force is applied to said other lever arm in a sense opposite to changing temperature, said motion transmitting means including means for progressively diminishing the motion transmitted with increasing temperature, in such manner that the effective length of said last mentioned lever arm varies substantially as the reciprocal of absolute temperature, said operative linkage including means supporting that lever arm with which the temperature compensation means is associated for movement effective to correct the final multiplying ratio of said linkage substantially in accordance with the factor $$\left(1+\frac{KV^2}{T}\right)$$

where V is true air speed, T is absolute temperature of the air, and K is a constant equal to $$\frac{\rho_s T_s}{4\gamma P_s}$$

where $\rho_s$ is the density of air at standard temperature $T_s$ and standard pressure $P_s$ and $\gamma$ is the ratio of the specific heat of air at constant pressure to the specific heat of air at constant volume.

30. An air speed indicator comprising an operating element movable in response to the differential of velocity air pressure and static air pressure, an indicating element, a variable multiplying ratio transmission embodying a series of concatenated motion transmitting elements operatively interconnecting said operating and indicating elements, static air pressure compensating means movable in response to changes in static air pressure and substantially independently of temperature for varying the ratio of motion received to motion transmitted of a motion transmitting element of said transmission proportionately to varying static air pressure, and temperature compensation means movable in response to changes in temperature and substantially independently of static air pressure, including means having a diminishing motion characteristic approximating a reciprocal function, for varying the ratio of motion received to motion transmitted of a motion transmitting element of said transmission as the reciprocal of absolute temperature.

31. In an air speed indicator, the combination of differential pressure operated means movable in response to the differential of velocity air pressure and static air pressure, indicating means, an operative linkage interconnecting said differential pressure operated means and said indicating means, said operative linkage embodying, in effect, two pivoted motion transmitting arms of variable effective lengths, said arms assuming predetermined zero deflection positions for zero differential of velocity and static air pressures, an operative connection associated with each of said arms forming an element in said linkage and adapted to be slidably moved along the length of its associated arm, static pressure compensating means, including operating means movable in response to varying static air pressure, for moving the operative connection associated with one of said arms by a force applied in a direction parallel to the zero deflection position of said arm, and in a sense and amount such as to vary the multiplying ratio of the linkage inversely with static air pressure, and temperature compensating means, including means movable in response to air temperature, for moving the operative connection associated with the other of the arms by a force applied in a direction parallel to the zero deflection position of said arm, and in a sense and amount such as to vary the multiplying ratio of the linkage directly with absolute air temperature.

LEO NEVIN SCHWIEN.